(12) United States Patent
McDonald et al.

(10) Patent No.: US 12,084,221 B2
(45) Date of Patent: Sep. 10, 2024

(54) LOW FRICTION ISBM BOTTLES

(71) Applicant: TOTALENERGIES AMERICAN SERVICES, INC., Houston, TX (US)

(72) Inventors: Russell McDonald, Humble, TX (US); Michael McLeod, Houston, TX (US); Fengkui Li, Houston, TX (US); Theodore Harris, III, Houston, TX (US)

(73) Assignee: TOTALENERGIES AMERICAN SERVICES, INC., Houston, TX (US)

( * ) Notice: Subject to any disclaimer, the term of this patent is extended or adjusted under 35 U.S.C. 154(b) by 317 days.

(21) Appl. No.: 17/731,695

(22) Filed: Apr. 28, 2022

(65) Prior Publication Data

US 2022/0348375 A1 Nov. 3, 2022

Related U.S. Application Data

(60) Provisional application No. 63/181,026, filed on Apr. 28, 2021.

(51) Int. Cl.
*B65D 1/02* (2006.01)
*B29C 49/00* (2006.01)
(Continued)

(52) U.S. Cl.
CPC ........ *B65D 1/0207* (2013.01); *B29C 49/0005* (2013.01); *B29C 49/08* (2013.01);
(Continued)

(58) Field of Classification Search
CPC ..... B29C 49/0005; B29C 49/08; B29C 49/06; B29K 2105/0032; B29K 2995/0077
See application file for complete search history.

(56) References Cited

U.S. PATENT DOCUMENTS 9,371,173 B2   6/2016  Smith et al.
9,505,161 B2 * 11/2016  Sun .................. B29C 49/06
2020/0362163 A1  11/2020  Tatum

FOREIGN PATENT DOCUMENTS

EP          3129212       2/2020
KR       20140033083      3/2014
(Continued)

OTHER PUBLICATIONS

International Search Report and Written Opinion issued in Corresponding PCT Application No. PCT/US2022/026660, dated Sep. 26, 2022.

*Primary Examiner* — Michael C Miggins
(74) *Attorney, Agent, or Firm* — NORTON ROSE FULBRIGHT US LLP

(57) ABSTRACT

Disclosed is an injection stretch blow molded (ISBM) container containing a surface having a static coefficient of friction (COF) of 0.15 to 0.21, a dynamic COF of 0.06 to 0.1, wherein the surface retains a water contact angle of 76° or higher for up to three minutes after wetting of the surface with a water drop of 14 to 16 mm diameter and the container is made with a polymeric composition containing a high density polyethylene (HDPE) having a dispersity (Mw/Mn) of 9 or higher as measured by GPC; a MI2 of 1 g/10 min or higher as measured by ASTM D-1238; 190° C./2.16 kg, as measured by ASTM D-1238; and an environmental stress crack resistance (ESCR) at 100% Igepal of >150 hours as measured by ASTM D-1693, B.

19 Claims, 3 Drawing Sheets

(51) Int. Cl.
*B29C 49/06* (2006.01)
*B29C 49/08* (2006.01)
*B29K 23/00* (2006.01)
*B29K 105/00* (2006.01)
*B29L 31/00* (2006.01)

(52) U.S. Cl.
CPC ............ *B65D 1/0223* (2013.01); *B29C 49/06* (2013.01); *B29K 2023/065* (2013.01); *B29K 2105/0032* (2013.01); *B29K 2105/0094* (2013.01); *B29K 2995/0063* (2013.01); *B29K 2995/0077* (2013.01); *B29K 2995/0082* (2013.01); *B29K 2995/0088* (2013.01); *B29L 2031/7158* (2013.01); *B65D 2501/0081* (2013.01)

(56) References Cited

FOREIGN PATENT DOCUMENTS

| WO | WO 2017/155712 | 9/2017 |
| WO | WO 2020/102434 | 5/2020 |

\* cited by examiner

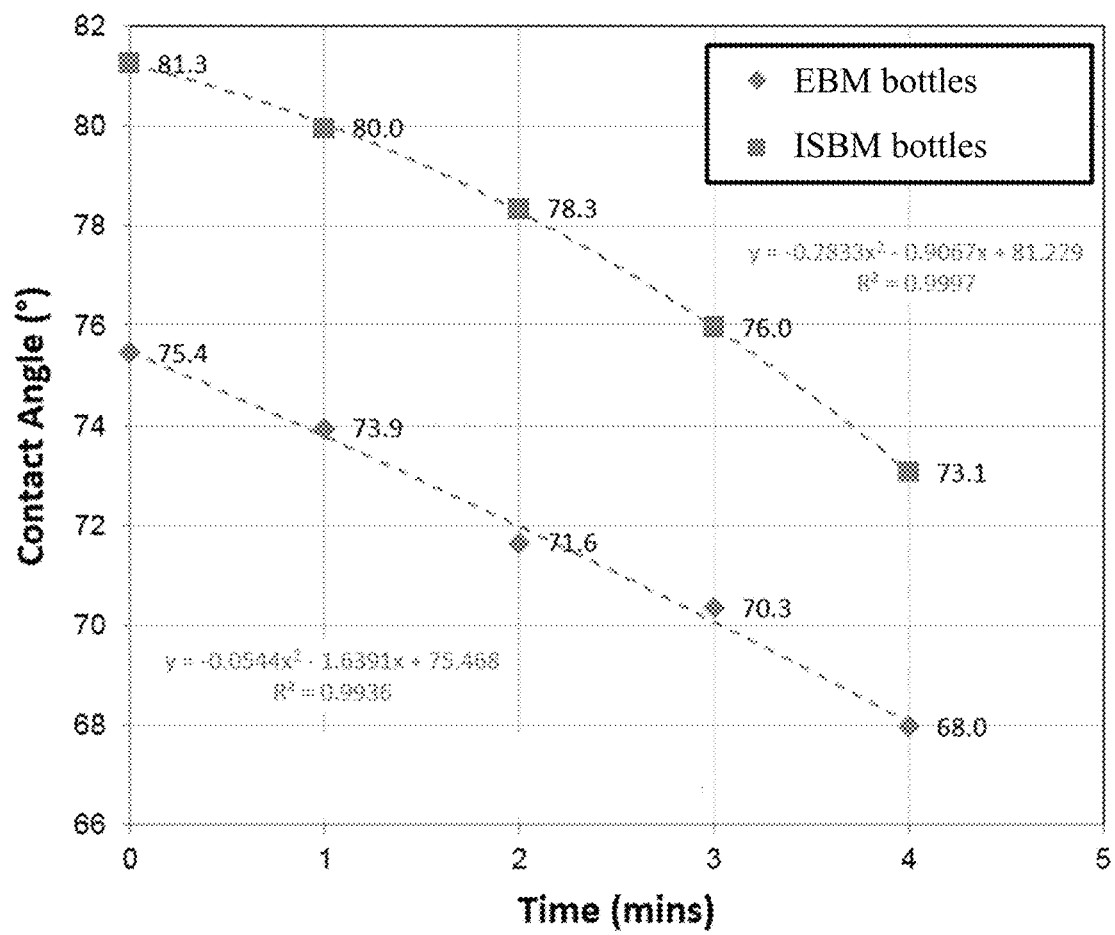
FIG. 3
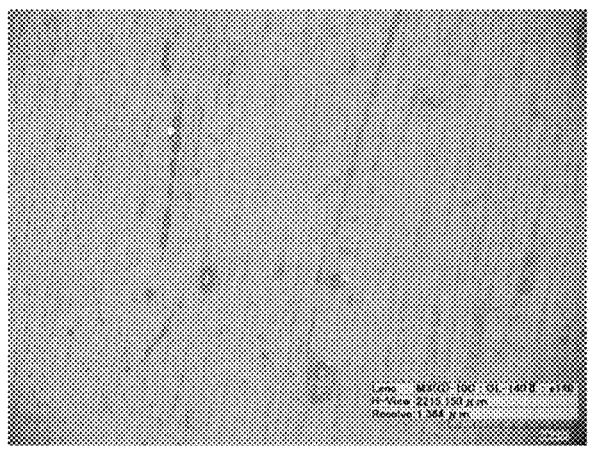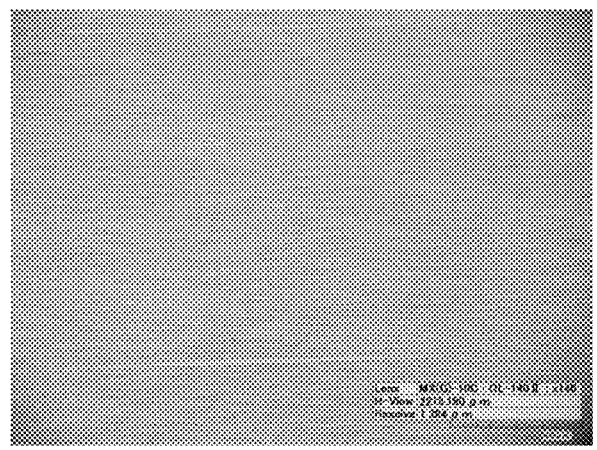
FIG. 4A    FIG. 4B

LOW FRICTION ISBM BOTTLES

CROSS REFERENCE TO RELATED APPLICATIONS

This application claims priority to U.S. Provisional Application No. 63/181,026, filed Apr. 28, 2021, which is incorporated herein by reference in its entirety for all purposes.

BACKGROUND OF THE INVENTION

A. Field of the Invention

The invention generally concerns injection stretch blow molded (ISBM) containers. In some aspects, the invention concerns ISBM containers that have characteristics allowing for efficient removal of food products from the containers without the use of surface coatings.

B. Description of Related Art

There is a demand for containers that retain less residual content (e.g., food products) after emptying the contents of the containers. Benefits of such containers include reduced waste, ease of recycling, ease of use, reduced environmental impact, increased value for price, and/or aesthetic appearance.

U.S. Pat. No. 9,371,173 discloses food containers containing lubricating surface coatings. The containers can include a textured surface that is impregnated with a liquid coating that wets the textured surface and provides for a lubricated surface. This can help with removal of the contents from the container. However, the impregnating liquid needs to be immiscible with the contents of the container and thus needs to be matched or customized with the contents. For example the impregnating liquid used for a container for an energy drink might not work well with honey, salad dressings, or other liquids that have different characteristics (e.g., more hydrophilic, less hydrophilic, more hydrophobic, less hydrophobic, etc.) than the energy drink. Thus, the use of coatings such as those described in U.S. Pat. No. 9,371,173 might suffer from problems due to lack of economy of scale in view of container manufacturers desires to make different containers for different contents. Recycling of such coated containers also might create additional problems given that containers for different types of liquids might contain different impregnating liquid coatings and thus might not be recycled together. Still further, the impregnating liquid coatings may be toxic and/or difficult to remove from the material (e.g., thermoplastic material) that makes up the bulk of the container.

SUMMARY OF THE INVENTION

A discovery has been made that provides a solution to at least some of the aforementioned problems. In one aspect, the solution includes the use of a high density polyethylene (HDPE) polymer in combination with an injection stretch blow molding (ISBM) process to produce containers that have surface characteristics allowing for the efficient removal of contents (e.g., food products) from the container. Without wishing to be bound by theory, it is believed that the ISBM process, as compared with the typically used extrusion blow molding (EBM) process, in combination with the HDPE polymer composition can provide good surface characteristics of the container ranging from surface roughness, coefficient of friction, water contact angle, and/or surface uniformity, thereby making it easier to remove contents from the container. In one particular aspect, the HDPE polymeric composition used to make the ISBM container can have (1) a dispersity (Mw/Mn) of 9 or higher as measured by GPC, (2) a MI2 of 1 g/10 min or higher as measured by ASTM D-1238, 190° C./2.16 kg, (3) a shear response (HLMI/MI2) of 40 or higher, as measured by ASTM D-1238; and (4) an environmental stress crack resistance (ESCR) at 100% Igepal of >150 hours as measured by ASTM D-1693, B. An advantage of the containers of the present invention is that they can be more easily recycled by, for example, using less water or other liquids to remove the contents of the container during the recycling process. Another advantage can be reduced waste of the contents of the container, as the easier removal of the contents can result in actual use of the contents prior to the container being "thrown away" for being "empty." Yet another advantage of the containers of the present invention is that they can be mass produced with reduced or no need to match the contents that the container will contain. That is, the containers of the present invention can avoid or reduce the customization issues seen with currently available containers that are customized to a particular content (e.g., a food content). Still further, without the use of coatings, the containers of the present invention can be recycled together, whereas some currently available containers having different coatings are recycled separately due to the different types of coatings being used.

One aspect of the present invention is directed to an injection stretch blow molded (ISBM) container. The ISBM container can contain a surface having a static coefficient of friction (COF) of 0.15 to 0.21, and a dynamic COF of 0.06 to 0.1. The surface can retain a water contact angle 76° or higher for up to three minutes after wetting of the surface with a water drop of 14 to 16 mm, such as about 15 mm. The surface can be an internal surface of the container e.g. a surface that comes in contact with a material inside the container. Material and content can be used interchangeable throughout the specification. The container can be made by injection stretch blow molding of a polymeric composition containing a HDPE, where the HDPE has a dispersity (Mw/Mn) of 9 or higher as measured by gel permeation chromatography (GPC); a melt index (MI2) of 1 g/10 min or higher as measured by ASTM D-1238, 190° C./2.16 kg; a shear response (HLMI/MI2) of 40 or higher, as measured by ASTM D-1238; and an environmental stress crack resistance (ESCR) at 100% Igepal of >150 hours as measured by ASTM D-1693, B. Mw can be the weight average molecular weight of the HDPE as measured by GPC, Mn can be the number average molecular weight of the HDPE as measured by GPC. HLMI can be high load melt index. In some aspects, the surface of the container having the aforementioned surface characteristics does not include or is not coated with a coating. In such aspects, the HDPE polymeric composition forms the surface of the container.

In some aspects, the HDPE can have a dispersity of 9 to 12 as measured by GPC; a MI2 of 1 g/10 min to 8 g/10 min as measured by ASTM D-1238, 190° C./2.16 kg; an ESCR 100% at Igepal of 180 to 300 hours as measured by ASTM D-1693, B; or any combinations thereof. In some aspects, the HDPE resin can have a density of 0.94 g/cc to 0.97 g/cc as measured by ASTM D792; a zero shear viscosity of 15,000 Pa·sec to 250,000 Pa·sec; a peak molecular weight of 20,000 g/mol or greater as measured by GPC; or any combinations thereof. In some aspects, the HDPE can have a dispersity of 9 to 12 as measured by GPC; a MI2 of 1 g/10 min to 8 g/10 min or 2/10 min as measured by ASTM D-1238, 190° C./2.16 kg; an ESCR 100% at Igepal of 180 to 300 hours as measured by ASTM D-1693, B; a density of 0.94 g/cc to 0.97 g/cc as measured by ASTM D792; a zero shear viscosity of 15,000 Pa·sec to 250,000 Pa·sec; and a peak molecular weight of 20,000 g/mol or greater as measured by GPC. In some particular aspects, the HDPE resin can have a MI2 of 2 g/10 min as measured by ASTM D-1238, 190° C./2.16 kg; a tensile strength @ yield of 4,600 as measured by ASTM D-638, Type IV specimen, 2 in/min; an elongation at break of >600% as measured by ASTM D-638, Type IV specimen, 2 in/min; a flexural modulus of 210 kpsi as measured by ASTM D-790; an ESCR 100% lgepal of >200 hours as measured by ASTM D-1693, B; and a density of 0.958 g/cm$^3$ as measured by ASTM D-792.

The polymeric composition, e.g. used to make the containers of the present invention by ISBM, can contain at least 99 wt. %, or 99 wt. % to 99.9 wt. %, or 99 wt. % to 100 wt. % of the HDPE and optionally one or more additives. The one or more additives can be selected from the group containing an acid scavenger, anti-oxidant, UV-absorbent, nucleating agent, colorant, lubricant, processing aid, plasticizer, flow modifier, and any combinations thereof. In some aspects, the one or more additive can contain an acid scavenger, nucleating agent, colorant and/or lubricant. The nucleating agent can contain a carboxlate salt such as a dicarboxlate salt and/or fatty acid salt, sorbitol derivative, nonitol derivative, or any combinations thereof. In some aspects, the nucleating agent can be disodium bicyclo[2.2.1] heptane-2,3-dicarboxylate; calcium salt of 1,2-cyclohexanedicarboxylic acid; zinc stearate; calcium stearate; 1,3:2,4-bis(3,4-dimethylbenzylidene) sorbitol; talc; sodium benzoate; or any combinations thereof. In some aspects, the polymeric composition can optionally contain 0.01 wt. % to 1 wt. % of the nucleating agent. The colorant can contain titanium dioxide; carbon black; an organic dye such as a polycyclic mono-azo metal complex, and/or polycyclic di-azo metal complex; or any combinations thereof. In some aspects, the polymeric composition can optionally contain 0.01 wt. % to 1 wt. % of the colorant. The lubricant can contain oleoamide, erucamide, behenamide, silica modified high molecular weight siloxane polymer dispersed in polyethylene, or any combinations thereof. In some aspects, the polymeric composition can optionally contain 0.01 wt. % to 1 wt. % of the lubricant. In some aspects, the acid scavenger can contain calcium stearate, zinc stearate, hydrotalcite, zinc oxide, or any combinations thereof. In some aspects, the acid scavenger can contain zinc stearate, hydrotalcite, zinc oxide, or any combinations thereof. In some aspects, the polymeric composition can optionally contain 200 to 3000 ppm, alternatively 200 to 2000 ppm by weight of an acid scavenger.

The containers of the present invention can be of any suitable shape and size. In some aspects, a cross-section of a lumen of the container along a transverse plane e.g. a plane perpendicular to the longitudinal axis of the container can be of circular, oval, elliptical, triangle, square, rectangular, pentagonal, hexagonal, heptagonal, octagonal, nonagonal, decagonal, rounded triangle, rounded square, rounded rectangular, rounded pentagonal, rounded hexagonal, rounded heptagonal, rounded octagonal, rounded nonagonal, or rounded decagonal shape. In some particular aspects, the cross-section can be of hexagonal or rounded hexagonal shape. Containers having other shapes and/or cross-sectional shape can readily be made. Cross-sections of the lumen along planes perpendicular to the longitudinal axis of the container can vary in shape and size along the length of the longitudinal axis. The container walls can have a thickness of 0.05 to 2 mm or 0.1 to 1 mm. The container can have walls with uniform or non uniform thickness.

One aspect is directed to a process for making the ISBM container. The ISBM container can be made by injection stretch blow molding of the polymeric composition. The injection stretch blow molding process can include injection molding of the polymeric composition to form a preform, and stretch-blowing the preform to form the ISBM container. In some aspects, the polymeric composition can be melted at a melt temperature of 300 to 600° F., or 350 to 550° F. or 450 to 500° F. and/or the melted polymeric composition can be injected into a preform mold at an injection pressure 400 to 1000 psi to form the preform. The injection molding of the polymeric composition can be performed in an extruder. The melt temperature can depend on the polymeric composition, the melt temperature can be high enough such that the melted polymeric composition flows freely in the extruder barrel but low enough such that relatively less decomposition of the melted polymeric composition is observed. In some aspects, the preform can have a tube like shape. The preform can contain the neck of the ISBM container to be formed including threads, known as the finish. In some aspects, the preform can be conditioned to form a preform having a desired temperature profile, and the preform having the desired temperature profile can be stretch-blown to form the ISBM container. In some aspects, the preform e.g. preform with desired temperature profile, can be stretch blown to form the ISBM container at a stretch rate of 25 to 150 cm/s and/or a stretch pressure of 150 to 500 psi. Without intended to be limited by theory, it is believed that stretch-rate influences material distribution in the final part, and pressure influences part detail and fullness. If the pressure is too low, the produced part might not have all the desired features.

The ISBM process can be a one stage ISBM process or a two stage ISBM process. In a one stage ISBM process, typically the steps of forming the preform, conditioning the preform, and stretch blowing the preform is performed in a single machine. By comparison, a two stage ISBM typically the step of forming the preform is performed in a separate machine than the steps of conditioning the preform and/or stretch blowing the preform. In some aspects, the surface of the produced container having the aforementioned surface characteristics does not include or is not coated with a coating. In such aspects, the HDPE polymeric composition forms the surface of the container.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions and systems of the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, or within 5%, or within 1%, and or within 0.5%.

The terms "wt. %," "vol. %," or "mol. %" refer to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification include any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process and systems of the present invention can "comprise," "consist essentially of," or "consist of" particular ingredients, components, compositions, steps, etc. disclosed throughout the specification. With respect to the transitional phrase "consisting essentially of," in one non-limiting aspect, a basic and novel characteristic of the containers and processes of making the containers of the present invention can include ISBM HDPE containers that have a surface having a static coefficient of friction (COF) of 0.15 to 0.21 and a dynamic COF of 0.06 to 0.1.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIG. 3: Comparison of water contact angles of an ISBM HDPE container of the present invention and an EBM HDPE container over time after wetting the surfaces with water drops of diameter around 15 mm.

FIGS. 4A-B: Optical microscopy image of the EBM HDPE (FIG. 4A) and ISBM HDPE (FIG. 4B) container surfaces.

Figure 1:
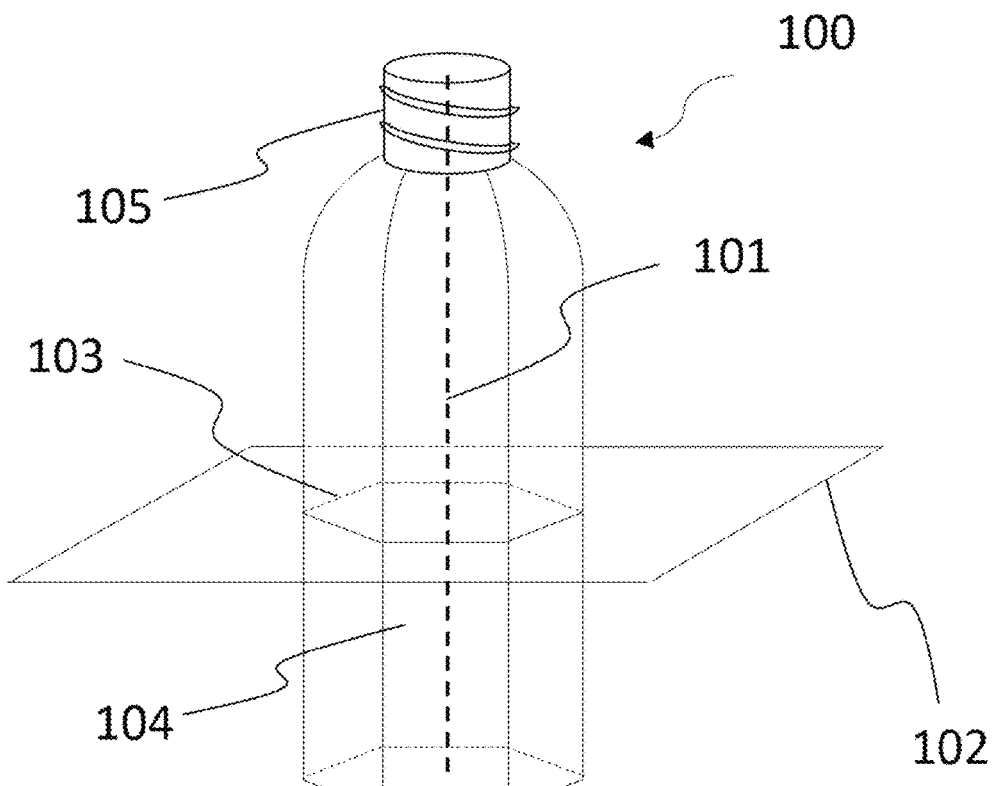
FIG. 1: An illustration of an ISBM HDPE container according to an example of the present invention.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the aforementioned problems with removing contents from containers. In one aspect, the solution includes providing an ISBM container containing a polymeric composition containing a HDPE. As illustrated in a non-limiting manner in the Examples, an ISBM container made from a HDPE having a dispersity (Mw/Mn) of 9 or higher as measured by GPC; a MI2 of 1 g/10 min or higher as measured by ASTM D-1238, 190° C./2.16 kg; a shear response (HLMI/MI2) of 40 or higher, as measured by ASTM D-1238; and an environmental stress crack resistance (ESCR) at 100% Igepal of >150 hours as measured by ASTM D-1693, B can have surfaces with relatively low friction, such as a static COF of 0.15 to 0.21 and a dynamic COF of 0.06 to 0.1.

These and other non-limiting aspects of the present invention are discussed in further detail in the following sections.

A. Injection Stretch Blow Molded (ISBM) Containers

An ISBM HDPE container of the present invention can be made by injection stretch blow molding of a polymeric composition containing a HDPE. The container can have any suitable shape and/or size. In some aspects, the container can have a size of 0.1 L to 10 L, or at least any one of, equal to any one of, or between any two of 0.1, 0.2, 0.3, 0.4, 0.5, 0.6, 0.7, 0.8, 0.9, 1, 2, 3, 4, 5, 6, 7, 8, 9 and 10 L. The container walls can have a thickness of 0.05 mm to 2 mm, or 0.1 to 1 mm, or at least any one of, equal to any one of, or between any two of 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, and 2 mm. The container walls independently can have uniform and/or non-uniform thickness.

In some aspects, a cross-section of a lumen or bore of the container along a transverse plane e.g. a plane perpendicular to the longitudinal axis of the container can be of circular, oval, elliptical, star, triangle, square, rectangular, pentagonal, hexagonal, heptagonal, octagonal, nonagonal, decagonal, rounded star, rounded triangle, rounded square, rounded rectangular, rounded pentagonal, rounded hexagonal, rounded heptagonal, rounded octagonal, rounded nonagonal, rounded decagonal or irregular shape. The container can have uniform or non-uniform shape. Referring to FIG. 1, an ISBM container 100 according to an embodiment of the present invention is shown. The container can have a longitudinal axis 101. The plane 102 can be a plane perpendicular to the longitudinal axis 101. 103 shows a cross-section of the lumen or bore 104 of the container 100 along the plane 102. Cross-sections of the lumen along various planes perpendicular to the longitudinal axis 101 can have similar or different shape and/or size. In some particular aspects, the cross-section can be hexagonal or rounded hexagonal shaped. As used herein a rounded polygon, for example rounded hexagon, can refer to a hexagon with the rounded corners/edges.

The container can have an inner surface, such as at least a portion of the inner surface or the whole inner surface, having static coefficient of friction (COF) of 0.15 to 0.21, and a dynamic COF of 0.06 to 0.1. An outer surface opposing the inner surface can have the same or a different COF. The coefficient of friction can be measured against steel and at a normal force of 16.71 N applied to the surface. The COF between the inner surface and a steel plate can be measured by attaching a container wall portion of size 2.5"×1" to a 2.5"×2.5" sled. The sled can be loaded such that a normal force applied to the container wall surface is 16.71 N. The sled can be pulled at a rate of 6 in/min. The static COF can be calculated from the force required at the start of movement, and the dynamic COF can be calculated from the average force required to pull a distance of 2" to 6". The inner surface can retain a water contact angle of 76° or higher, or 76° to 82° for up to three minutes after wetting of the surface with a water drop of diameter of 14 to 16 mm or about 15 mm. An outer surface opposing the inner surface can have the same or a different water contact angle value or characteristic. In some aspects, the inner surface and/or the outer surface is/are not coated with a coating. In such aspects, the HDPE polymeric composition forms the surface(s) of the container.

An ISBM HDPE container of the present invention can be used or is capable of being used to contain food and/or consumer products. The food and/or the consumer products can include liquid or semi-solid products. Semi-solid products typically have a higher viscosity than liquid products. Non-limiting examples of food and/or consumer products include, but are not limited to, ketchup/catsup, mustard, mayonnaise, syrup, honey, jelly, peanut butter, butter, chocolate syrup, shortening, butter, margarine, oleo, grease, dip, yogurt, sour cream, ice cream, sticky food (e.g., candy, chocolate syrup, mash, yeast mash, beer mash, taffy), food oil, fish oil, marshmallow, dough, batter, baked goods, chewing gum, bubble gum, butter, cheese, cream, cream cheese, mustard, yogurt, sour cream, curry, sauce, ajvar, curry wurst sauce, salsa lizano, chutney, pebre, fish sauce, tzatziki, sriracha sauce, vegemite, chimichurri, HP sauce/brown sauce, harissa, kochujang, hoisan sauce, kim chi, cholula hot sauce, tartar sauce, tahini, hummus, shichimi, ketchup, pasta sauce, alfredo sauce, spaghetti sauce, icing, dessert toppings, whipped cream, a food additive (e.g., ethyl oleate), fatty acids, proteins, a vegetable oil (e.g., olive oil, light olive oil, corn oil, soybean oil, rapeseed oil, linseed oil, grapeseed oil, flaxseed oil, canola oil, peanut oil, safflower oil, sunflower oil), sanitizers, cosmetics, shampoo, lotion, cream, hair gel, toothpaste, and/or liquid soap.

B. HDPE Polymeric Composition

The polymeric composition or resin can contain at least 99 wt. %, or 99% wt. % to 99.9 wt. % or 99 wt. % to 100 wt. % or at least any one of, equal to any one of, or between any two of 99, 99.1, 99.2, 99.3, 99.4, 99.5, 99.6, 99.7, 99.8, 99.9 and 100% of the HDPE and optionally one or more additives with total additive content of 0 to 1 wt. % or at least any one of, equal to any one of, or between any two of 0, 0.1, 0.2, 0.3, 0.4, 0.5, 0.6, 0.7, 0.8, 0.9 and 1 wt. %.

i. HDPE

The HDPE can have a weight average molecular weight (Mw) of 100000 to 250000 g/mol as measured by GPC. The HDPE can have a dispersity (Mw/Mn) 9 or higher, or 9 to 12 as measured by GPC. The HDPE can have a peak molecular weight of 20,000 g/mol or higher, or 20000 to 50000 g/mol as measured by GPC. The HDPE can have a MI2 of 1 g/10 min or greater, or 1 g/10 min to 8 g/10 min, or at least any one of, equal to any one of, or between any two of 1, 2, 3, 4, 5, 6, 7 and 8 g/10 min as measured by ASTM D-1238; 190° C./2.16 kg. The HDPE can have an environmental stress resistance (ESCR) at 100% Igepal of greater than 150 hours, or greater than 160 hours, or greater than 170 hours, or greater than 180 hours, or 180 hours to 300 hours as measured by ASTM D-1693. The HDPE can have a density of 0.94 g/cc to 0.97 g/cc, or at least any one of, equal to any one of, or between any two of 0.94, 0.945, 0.95, 0.955, 0.96, 0.965 and 0.97 g/cc as measured by ASTM D792. The HDPE can have a zero shear viscosity of 15000 Pa·sec to 250000 Pa·sec, or at least any one of, equal to any one of, or between any two of 15000, 25000, 50000, 75000, 100000, 125000, 150000, 175000, 200000, 225000, and 250000 Pa sec. The HDPE can be metallocene or a non-metallocene HDPE. The HDPE can be an unimodal or a bimodal HDPE. In certain aspects, the HDPE can be a non-metallocene bimodal HDPE.

The HDPE used can have at least one of, any combination of, or all of the properties mentioned herein.

In some aspects, a combinations of two or more HDPEs e.g. having different properties can be used. Non-limiting examples of commercially available HDPEs can be used includes 9260, SB1359NA available from TOTAL.

ii. Additives

The polymeric composition can optionally contain one or more additives. The optional one or more additives can be selected from the group containing acid scavenger, antioxidant, UV-absorbent, nucleating agent, colorant, lubricant, processing aid, plasticizer, flow modifier and any combinations thereof.

The nucleating agent can contain a carboxylate salt such as dicarboxylate salt and/or fatty acid salt, sorbitol derivative, nonitol derivative, or any combinations thereof. In some aspects, the nucleating agent can be a hexahydrophthalic acid (HHPA) salt, e.g. calcium, strontium, lithium or monobasic aluminum salt of HHPA; disodium bicyclo[2.2.1]heptane-2,3-dicarboxylate; 1,2-cyclohexanedicarboxylic acid salt, such as calcium salt of 1,2-cyclohexanedicarboxylic acid; lithium, sodium, calcium, barium, magnesium, aluminum or zinc salt of fatty acid such as zinc stearate, or calcium stearate; 1,3:2,4-bis(3,4-dimethylbenzylidene) sorbitol; talc; sodium benzoate; or any combinations thereof. Without wishing to be bound by theory it is believed that compositions with relatively high degree of crystallinity and uniform crystalline structure can be obtained by adding nucleating agent(s). In some aspects, the polymeric composition can optionally contain 0.01 wt. % to 1 wt. % or at least any one of, equal to any one of, or between any two of 0.01, 0.05, 0.1, 0.2, 0.3, 0.4, 0.5, 0.6, 0.7, 0.8, 0.9 and 1 wt. % of the nucleating agent.

The colorant can be organic pigments, inorganic pigments, carbon black, white pigments, and/or aluminum pigments. The organic pigment can be an organic dye such as polycyclic mono-azo metal complex and/or polycyclic di-azo metal complex. The inorganic pigment can be a metal salt or a metal oxide such as titanium dioxide. In some aspects, the polymeric composition can optionally contain 0.01 wt. % to 1 wt. % or at least any one of, equal to any one of, or between any two of 0.01, 0.05, 0.1, 0.2, 0.3, 0.4, 0.5, 0.6, 0.7, 0.8, 0.9 and 1 wt. % of the colorant.

The lubricant can include oleoamide, erucamide, behenamide, silica modified high molecular weight siloxane polymer dispersed in polyethylene available from DOW CORNING under the trade name MB50-802, or any combinations thereof. In some aspects, the polymeric composition can optionally contain 0.01 wt. % to 1 wt. % or at least any one of, equal to any one of, or between any two of 0.01, 0.05, 0.1, 0.2, 0.3, 0.4, 0.5, 0.6, 0.7, 0.8, 0.9 and 1 wt. % of the lubricant.

The acid scavenger can include calcium stearate, zinc stearate, hydrotalcite, or zinc oxide or any combinations thereof. In some aspects, the acid scavenger can include zinc stearate, hydrotalcite, zinc oxide, or any combinations thereof. In some aspects, the polymeric composition can contain 200 to 3000 ppm, alternatively 200 to 2000 ppm, or at least any one of, equal to any one of, or between any two of 200, 400, 600, 800, 1000, 1200, 1400, 1600, 1800, 2000, 2200, 2400, 2600, 2800, and 3000 ppm of the acid scavenger.

C. Methods for Preparing an ISBM HDPE Container

ISBM HDPE containers of the present invention can be prepared by injection stretch blow molding of a HDPE polymeric composition. The injection stretch blow molding process can include injection molding the HDPE polymeric composition to form a preform and stretch-blowing the preform to form the ISBM container. In some aspects, the injection molding process can include mixing such as dry blending the components of the polymeric composition such as the HDPE and the optional one or more additives, melting the polymeric composition and injecting the melted polymeric composition into a preform mold. The injection molding process can be performed with an extruder. The extruder used can be a suitable extruder known in the art. The temperature of the melted HDPE polymeric composition can be high enough such that the melted HDPE polymeric composition flows freely in the extruder barrel but low enough such that relatively less decomposition of the polymeric composition is observed. In some aspects, the HDPE polymeric composition can be melted at a melt temperature of 300 to 600° F., or 350 to 550° F., or 450 to 500° F. or at least any one of, equal to any one of, or between any two of 300, 350, 400, 450, 500, 550 and 600° F. The injection pressure of the injection molding process can be 400 to 1000 psi, or at least any one of, equal to any one of, or between any two of 400, 500, 600, 700, 800, 900 and 1000 psi. The preform mold can be a multi-cavity mold, e.g. multiple preforms can be formed together. The preform can have a wall thickness of 1 mm to 8 mm, a length of 8 cm to 15 cm and/or a cross-sectional diameter or width of 30 mm to 40 mm. The preform can contain the neck of the ISBM HDPE container to be formed including threads, known as the finish. In some aspects, the preform formed by injection molding can be conditioned to form a preform having a desired temperature profile, and the preform having the desired temperature profile can be stretch-blown to form the ISBM HDPE container. In some aspects, conditioning process can include heating the preform with a suitable device, such as a reflective radiant heat oven, air knife, etc., and optionally allowing the heat to disperse through the preform.

The stretch-blowing process can include blowing air into the preform. In some aspects, the preform e.g. the preform with desired temperature profile, can be stretch blown with pressurized air at a stretch rate of 25 to 150 cm/s, or at least any one of, equal to any one of, or between any two of 25, 50, 75, 100, 125 and 150 cm/s and/or a stretch pressure of 150 to 500 psi, or at least any one of, equal to any one of, or between any two of 150, 175, 200, 225, 250, 275, 300, 325 350, 375, 400, 425 450, 475, and 500 psi. In certain aspects, prior to stretch blowing with pressurized air, the preform e.g. the preform with desired temperature profile, can optionally be axially stretched by a center rod to form an axially stretched preform and the axially stretched preform can be stretch blown with pressurized air to form the ISBM container.

The ISBM process can be a one stage ISBM process or a two stage ISBM process. In a one stage ISBM process, typically the steps of forming the preform, conditioning the preform, and stretch blowing the preform can be performed by a single machine. By comparison, in a two stage ISBM process, typically the step of forming the preform is performed in a separate machine than the steps of conditioning the preform and/or stretch blowing the preform.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Injection-Stretch Blow Molded (ISBM) and Extrusion Blow Molded (EBM) Containers

Figure 2:
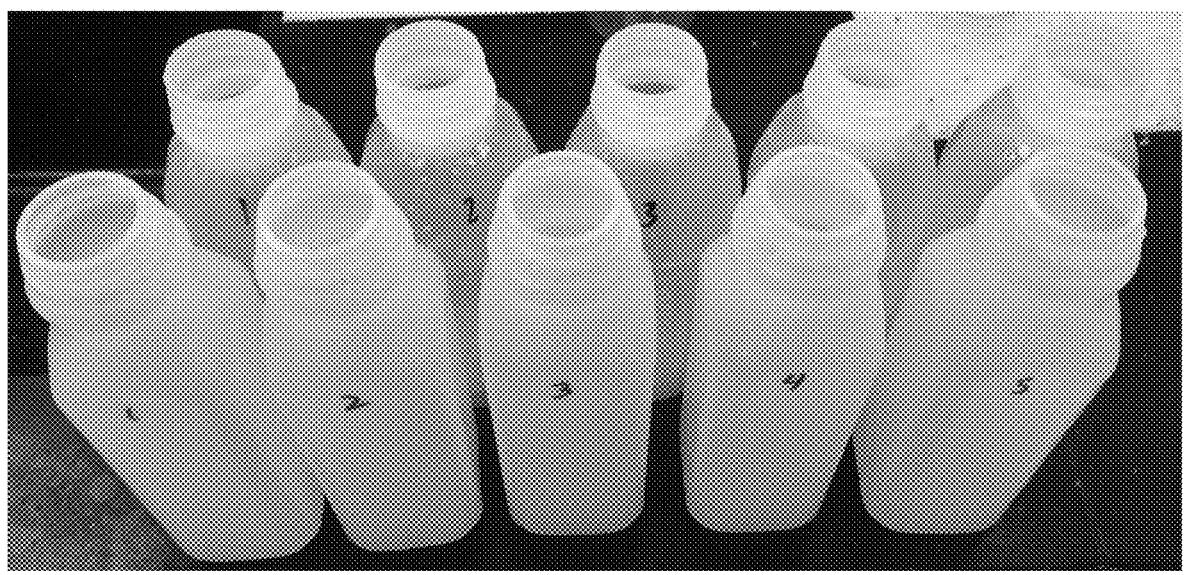
FIG. 2: Visual comparison of an ISBM HDPE container of the present invention and a HDPE extrusion blow molded (EBM) container after emptying of water from each container.

Injection-Stretch Blow Molded (ISBM) containers with hexagonal cross-section, similar to a common Gatorade type bottle and of size 0.5 liters were produced by injection stretch blow molding of HDPE resin SB1359NA (Table 1) available from TOTAL. In a comparative experiment extrusion blow molded (EBM) bottles with square shape were prepared by extrusion blow molding of HDPE resin 5502 (Table 1) available from TOTAL. ISBM conditions used are provided in Table 2. EBM bottles were produced on a UNILOY 250R1 blow molding machine. FIG. 2 illustrates the geometry of the bottles produced, with the front row bottles 1-5 being EBM bottles, and the back row bottles 1-5 being ISBM bottles.

TABLE 1

HDPE Resins

| | Method | Unit | SB1359NA (Value) | 55022 (Value) |
|---|---|---|---|---|
| MI2 (190° C., 2.16 Kg) | D-1238 | g/10 min | 2 | 0.35 |
| MI20 (190° C., 21.6 Kg) | D-1238 | g/10 min | 100 | 30 |
| Melt flow ratio (MI20/MI2) | | | 50 | 85.7 |
| Dispersity (Mw/Mn) | GPC | | 10 | 7 |
| Density | D-792 | g/cm$^3$ | 0.959 | 0.955 |
| Tensile Strength @ Yield | D-638 | psi | 4600 | 4000 |
| Elongation at Break | D-638 | % | >600 | 600 |
| Flexural Modulus | D-638 | kpsi | 210 | 200 |
| Environmental crack resistance (ESCR) 100% Igepal | D1693, B | hrs | >200 | 50 |

TABLE 2

ISBM Conditions
Toshiba EC180NII (Injection Molder); Husky Single
Cavity Preform Mold; ADS G62PP (ISBM Equipment)

| Preform Processing (23 g straight profile preform) | Melt Temperature | 450-500° F. |
| --- | --- | --- |
|  | Injection Time | 15-30 s |
|  | Cooling Time | 10-30 s |
|  | Injection Speed | 20-60 mm/s |
|  | Injection Pressure | 400-1000 psi |
| ISBM Processing | Production Rate | 1500-3000 bph |
|  | Stretch Rate | 50-100 cm/s |
|  | Stretch Pressure | 250-350 psi |
|  | Heater Power | 500-2000 W |

The bottles were tested for water retention. For each set, ISBM and EBM bottles, 5 bottles were taken. Clean and dry bottles were labeled and were individually weighed. The bottles were filled with water and kept undisturbed for 5 minutes. After that the bottles were emptied. Care was taken for not to splash the water being emptied out, on the outer surface of the bottles. Bottles were given one quick shake and were then immediately weighed. The initial weight, final weight and weight of the residual water left after emptying the water in the bottles are listed in Table 3. Data presented in Table 3 shows the EBM bottles retains roughly twice as much residual water after emptying compared to the ISBM bottles (0.42 g for EBM versus 0.20 g for ISBM).

TABLE 3

Water Retention of the ISBM and EBM Containers

| EBM bottle | | | | ISBM bottle | | | |
| --- | --- | --- | --- | --- | --- | --- | --- |
| Bottle # | Initial wt. (g) | Final wt. (g) | Residual water wt. (g) | Bottle # | Initial wt. (g) | Final wt. (g) | Residual water wt. (g) |
| 1 | 21.7303 | 22.3 | 0.5697 | 1 | 24.6676 | 24.8227 | 0.1551 |
| 2 | 21.7328 | 22.2098 | 0.477 | 2 | 24.7169 | 24.9713 | 0.2544 |
| 3 | 21.8791 | 22.1725 | 0.2934 | 3 | 24.5668 | 24.7568 | 0.19 |
| 4 | 21.961 | 22.3289 | 0.3679 | 4 | 24.5287 | 24.7568 | 0.22 |
| 5 | 21.6466 | 22.0528 | 0.4062 | 5 | 24.5602 | 24.7343 | 0.1741 |
| Av. | 21.78996 | 22.2128 | 0.42284 | Av. | 24.60804 | 24.80838 | 0.20034 |

To supplement the residual water phenomenon, the inner bottle surfaces were explored in detail. The water contact angle for inner surfaces of the bottles were measured using an optical microscope and precision dropper. Inner surface of the bottles were wetted with water drops of about 15 mm diameter and the water contact angle was monitored for 4 minutes with 1 minute increment. For each bottle types the experiment was repeated 5 times. FIG. 3 shows the water contact angle for the bottle surface over 4 minutes after initial wetting. As shown in FIG. 3, both surfaces exhibit a gradual drop in contact angle as the water droplet spreads out. The ISBM surface exhibits a higher contact angle (roughly 5-6° larger than EBM), indicating a more hydrophobic surface. Since the ISBM surface is more hydrophobic, it is reasonable to expect easier flow of water over the surface during emptying.

Figure 5A:
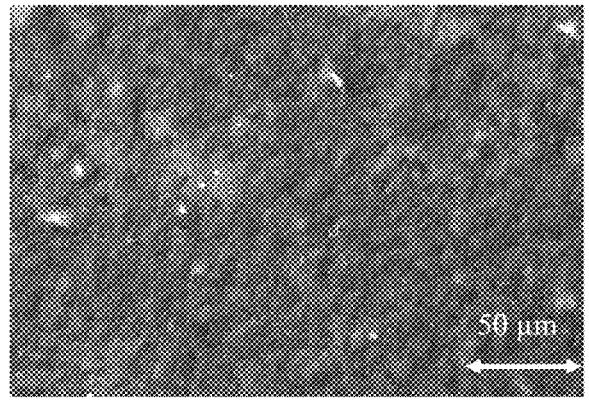
FIGS. 5A-B: Scanning electron microscopy (SEM) image of the EBM HDPE (FIG. 5A) and ISBM HDPE (FIG. 5B) container surfaces.
Figure 5B:
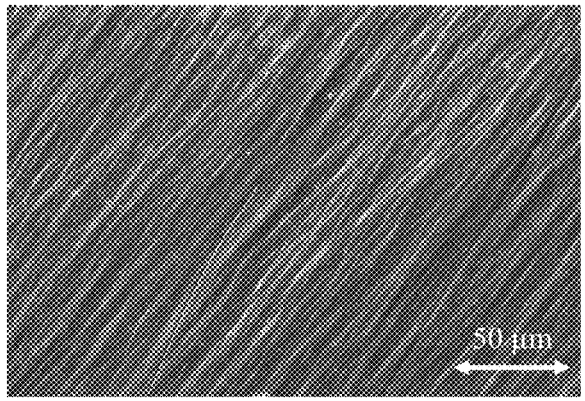

The bottle inner surfaces were also studied using an optical and a scanning-electron microscope (SEM). FIGS. 4A and 4B shows the optical microscopy image of an inner surface of the EBM bottle and an inner surface of the ISBM bottle respectively. As can be seen from FIG. 4, the EBM surface exhibits a more disorganized surface, while the ISBM surface is more oriented and uniform. The phenomenon seen in optical spectroscopy can be observed in more detail with SEM image of the surfaces. FIGS. 5A and 5B shows SEM image of an inner surface of the EBM bottle and an inner surface of the ISBM bottle respectively. As can be seen from FIG. 5, the EBM surface appears to contain a random agglomerations of material, while the ISBM surface appears to contain highly oriented polymer chains.

Figure 6:
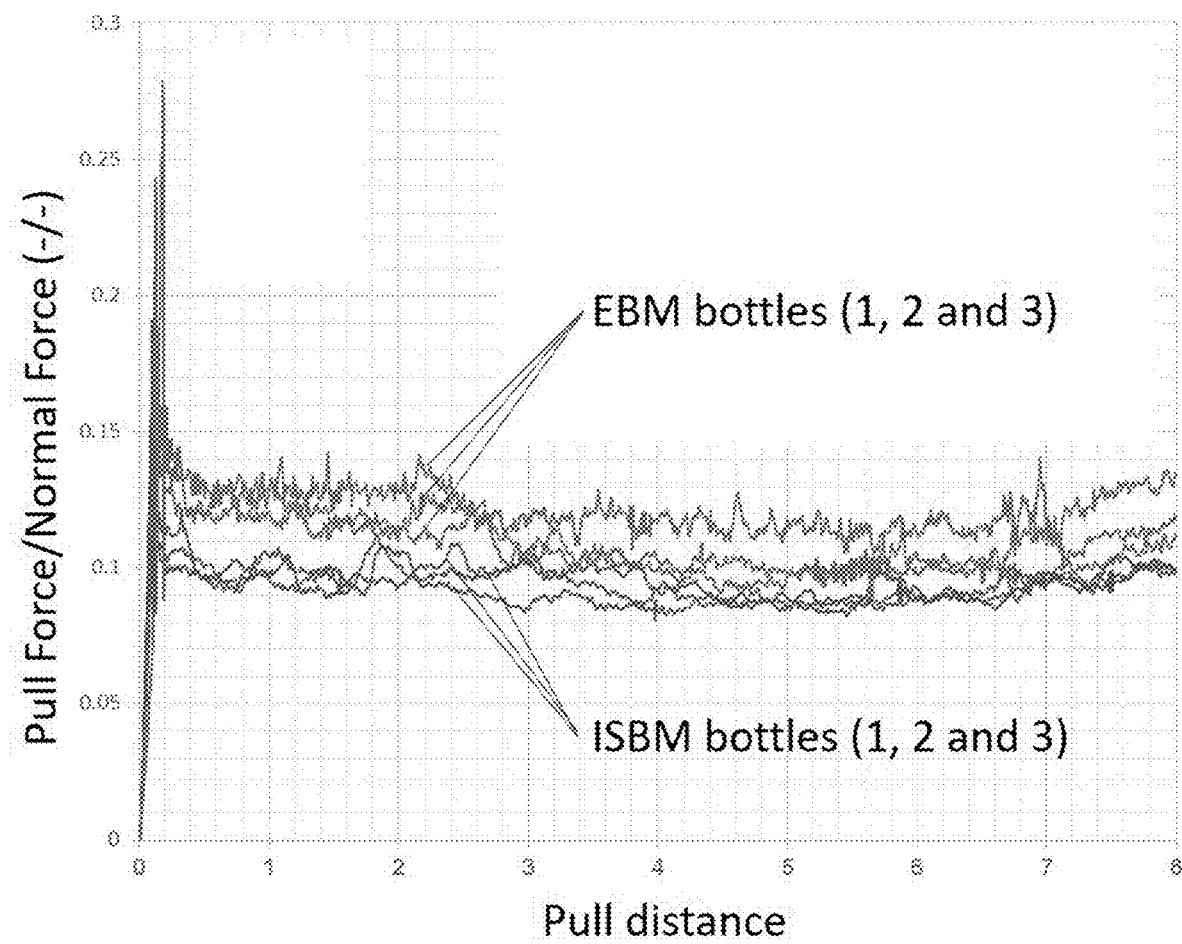
FIG. 6: Static COF and dynamic COF of the ISBM HDPE and EBM HDPE container surfaces.

Static and dynamic coefficient of friction (COF) of the bottle surfaces against steel were measured. The COF between the inner surface of the bottles and a steel plate was measured by attaching a bottle wall portion of size 2.5"×1" to a 2.5"×2.5" sled, and drawing across a stationary steel plate. The sled was loaded such that the normal force applied to the bottle surface was a total of 16.71 N. The sled was pulled at a rate of 6 in/min. The force was then measured at the start of movement (used to calculate the static COF), and averaged over the pull distance of 2" to 6" (used to calculate the dynamic COF). The process was repeated thrice, with good repeatability. The static and dynamic COF obtained for the ISBM and EBM surfaces are presented in FIG. 6. As can be seen from FIG. 6 inner surface of the ISBM bottles exhibits significantly lower static and dynamic COF, compared to the inner surface of the EBM bottles.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. An injection stretch blow molded (ISBM) container comprising:
   a surface having:
      a static coefficient of friction (COF) of 0.15 to 0.21; and
      a dynamic COF of 0.06 to 0.1; and
   a polymeric composition comprising a high density polyethylene (HDPE) having:
      a dispersity (Mw/Mn) of 9 or higher as measured by GPC;
      a MI2 of 1 g/10 min or higher as measured by ASTM D-1238; 190° C./2.16 kg; and an environmental stress crack resistance (ESCR) at 100% Igepal of >150 hours as measured by ASTM D-1693, B, wherein the surface comprises a water contact angle of 76° or higher for up to three minutes after wetting of the surface with a water drop having a diameter of 14 to 16 mm.

2. The ISBM container of claim 1, wherein the HDPE resin has a dispersity of 9 to 12 as measured by GPC; a MI2 of 1 to 8 g/10 min as measured by ASTM D-1238; 190° C./2.16 kg; and an ESCR at 100% Igepal of 180 to 300 hours as measured by ASTM D-1693, B.

3. The ISBM container of claim 1, wherein the HDPE resin has:
a density of 0.94 g/cc to 0.97 g/cc as measured by ASTM D792;
a zero shear viscosity of 15,000 Pa·sec to 250,000 Pa·sec; and
a peak molecular weight of 20,000 g/mol or greater as measured by GPC.

4. The ISBM container of claim 1, wherein the HDPE resin has:
a MI2 of 2.0 g/10 min as measured by ASTM D-1238; 190° C./2.16 kg;
a tensile strength @ yield of 4,600 psi as measured by ASTM D-638, Type IV specimen, 2 in/min;
an elongation at break of >600% as measured by ASTM D-638, Type IV specimen, 2 in/min;
a flexural modulus of 210 kpsi as measured by ASTM D-790;
an environmental stress crack resistance (ESCR) 100% Igepal of >200 hours as measured by ASTM D-1693, B;
a vicat of 260° F.; and
a density of 0.959 g/cm³ as measured by ASTM D-792.

5. The ISBM container of claim 1, wherein the container comprises an outer surface and an opposing inner surface, and wherein the inner surface comprises:
the static coefficient of friction (COF) of 0.15 to 0.21; and
the dynamic COF of 0.06 to 0.1.

6. The ISBM container of claim 1, wherein a food product is comprised in the container and in contact with at least a portion of the inner surface.

7. The ISBM container of claim 1, wherein a cross-section of a lumen of the container along a transverse plane of the container is circular, oval, elliptical, square, rectangular, pentagonal, hexagonal, heptagonal, octagonal, nonagonal, decagonal, rounded square, rounded rectangular, rounded pentagonal, rounded hexagonal, rounded heptagonal, rounded octagonal, rounded nonagonal, or rounded decagonal shaped.

8. The ISBM container of claim 7, wherein the cross-section is hexagonal or rounded hexagonal shaped.

9. The ISBM container of claim 1, wherein the polymeric composition comprises an additive.

10. The ISBM container of claim 9, wherein the additive is an acid scavenger, an anti-oxidant, a UV-absorbant, a nucleating agent, a colorant, a lubricant, a processing aid, a plasticizer, a flow modifier, or any combinations thereof.

11. The ISBM container of claim 10, wherein the nucleating agent comprises a carboxylate salt, dicarboxlate salt, fatty acid salt, sorbitol derivative, nonitol derivative, or any combinations thereof.

12. The ISBM container of claim 10, wherein the nucleating agent comprises disodium bicyclo[2.2.1]heptane-2,3-dicarboxylate; calcium salt of 1,2-cyclohexanedicarboxylic acid; zinc stearate, calcium stearate, 1,3:2,4-bis(3,4-dimethylbenzylidene) sorbitol or any combination thereof.

13. The ISBM container of claim 10, wherein the colorant comprises titanium dioxide, carbon black, polycyclic mono-azo metal complex, polycyclic di-azo metal complex or any combination thereof.

14. The ISBM container of claim 10, wherein the lubricant comprises oleoamide, erucamide, behenamide, silica modified high molecular weight siloxane polymer dispersed in polyethylene or any combination thereof, and the acid scavenger comprises calcium stearate, zinc stearate, hydrotalchite, zinc oxide or any combinations thereof.

15. A process for making the ISBM container of claim 1, the process comprising:
injection molding the polymeric composition to form a preform; and
stretch-blowing the preform to form the ISBM container.

16. The process of claim 15, wherein the preform is heat conditioned to form a preform having a desired temperature profile and the preform having the desired temperature profile is stretch-blown to form the ISBM container.

17. The process of claim 15, wherein the process is a one stage or a two stage injection stretch blow molding process.

18. The process of claim 15, wherein the injection molding condition of the polymeric composition comprises a melt temperature of 350 to 550° F. and/or an injection pressure of 400 to 1000 psi.

19. The process of claim 15, wherein the stretch-blowing conditions comprises a stretch rate of 25 to 150 cm/s and/or a stretch pressure of 150 to 500 psi.

* * * * *